Figure 1:
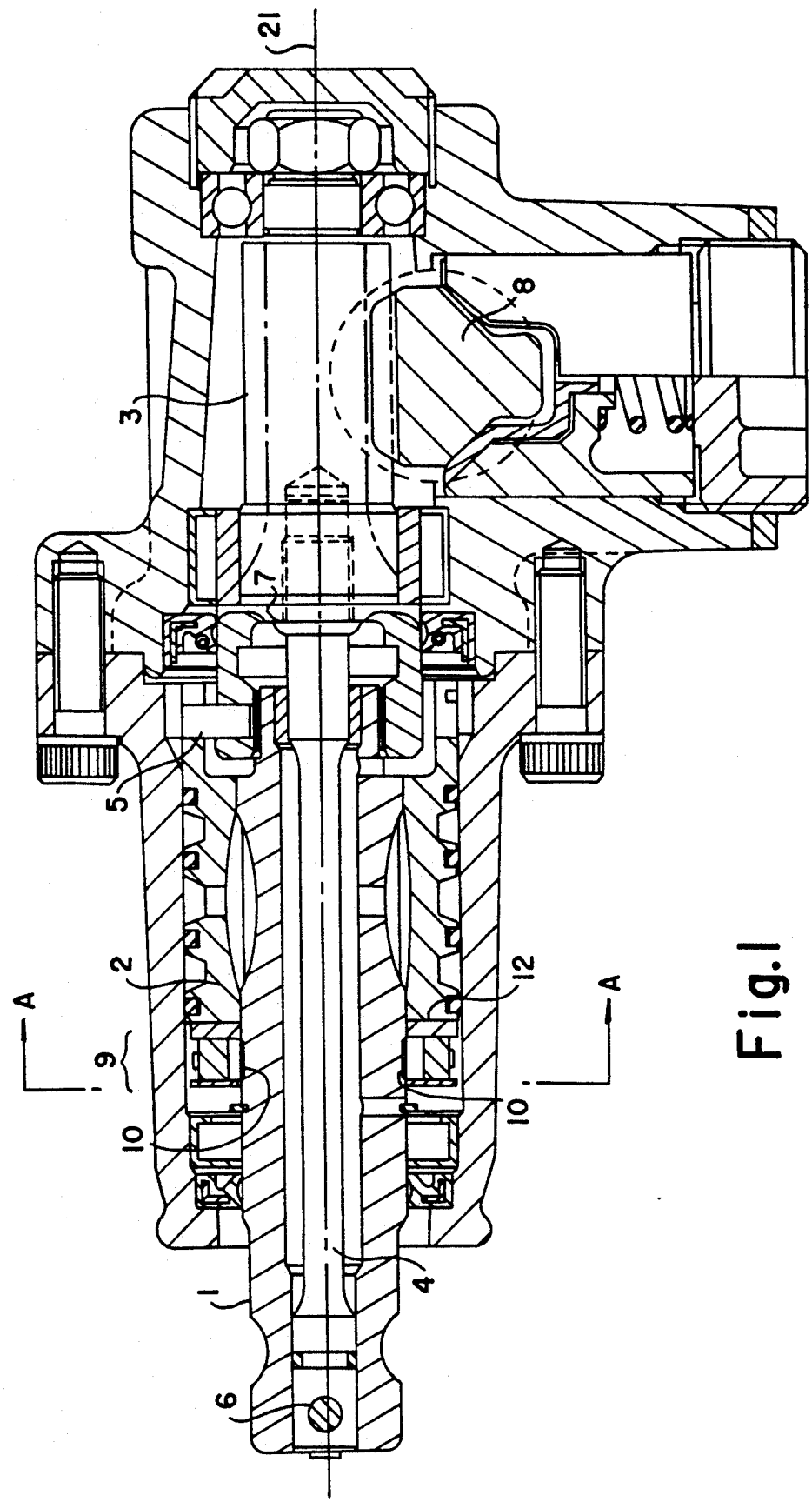

United States Patent

Bishop et al.

Patent Number: 5,233,906
Date of Patent: Aug. 10, 1993

[54] MECHANICAL CENTERING MECHANISM FOR ROTARY VALVE POWER STEERING SYSTEM

[75] Inventors: Arthur E. Bishop, Northwood; John Baxter, Chatswood; Geoffrey P. Dyer, Miller, all of Australia

[73] Assignee: A. E. Bishop & Associates, New South Wales, Australia

[21] Appl. No.: 879,385

[22] Filed: May 7, 1992

[51] Int. Cl.$^5$ ............................................. F15B 9/10
[52] U.S. Cl. .................................... 91/375 A; 91/371; 180/143
[58] Field of Search ............. 91/370, 371, 374, 375 R, 91/375 A, 382; 180/141, 143

[56] References Cited

U.S. PATENT DOCUMENTS

| | | | |
|---|---|---|---|
| 4,819,545 | 4/1989 | Dymond | 91/375 A X |
| 4,966,192 | 10/1990 | Umeda | 91/375 A X |
| 5,016,723 | 5/1991 | Sano | 91/375 A X |
| 5,046,574 | 9/1991 | Goodrich et al. | 180/143 |

FOREIGN PATENT DOCUMENTS

| | | | |
|---|---|---|---|
| 2434604 | 2/1975 | Fed. Rep. of Germany | 91/375 A |
| 3634215 | 4/1987 | Fed. Rep. of Germany | 91/375 A |
| 2044697 | 10/1980 | United Kingdom | 91/375 A |

Primary Examiner—Edward K. Look
Assistant Examiner—Hoang Nguyen
Attorney, Agent, or Firm—Nikaido, Marmelstein, Murray & Oram

[57] ABSTRACT

A hydraulic power steering rotary valve of generally conventional construction characterized in that the on-center characteristics of the valve are governed by an arrangement of rolling elements and pairs of notched elements arranged to produce a detent action between the input shaft and the sleeve or driven member. One notched element of each pair is fixed to a carrier which is connected to the sleeve or driven member by a securing device. During assembly, the carrier is free to move under the influence of springs acting on the notched elements and thereby take up a position such that after completion of assembly the notched elements and rolling elements are precisely in the correct position to provide the required detent action.

11 Claims, 7 Drawing Sheets

MECHANICAL CENTERING MECHANISM FOR ROTARY VALVE POWER STEERING SYSTEM

This invention relates to hydraulic power steering gears for motor vehicles and, in particular, to the rotary valves used in such steering gears.

Typically rotary valves for hydraulic power steering include an input-shaft, usually connected to the steering wheel of the vehicle by a flexible joint, and having in its outer periphery a plurality of blind ended, axially extending grooves separated by lands. Journalled on the input-shaft is a sleeve having in its bore an array of axially extending blind ended slots matching the grooves in the input-shaft, but in underlap relationship thereto, the slots of the one being wider than the lands of the other so defining a set of axially extending orifices which open and close when relative rotation occurs between the input-shaft and the sleeve. These orifices are ported as a network such that they form sets of hydraulic Wheatstone bridges which act in parallel.

Drilled passages in the input-shaft and sleeve, together with circumferential grooves in the periphery of the sleeve, serve to communicate oil between the grooves in the input-shaft and the slots in the sleeve, an engine driven oil pump, and right-hand and left-hand hydraulic assist cylinder chambers incorporated in the steering gear.

A torsion bar incorporated in the input-shaft serves to urge the input-shaft and sleeve towards a neutral, centred condition when no power assistance is required. When input torque is applied by the driver to the steering wheel, the torsion bar deflects, causing relative rotation of the sleeve and input-shaft from the neutral condition. This so called "valve operating angle" imbalances the sets of hydraulic Wheatstone bridges and hence causes a differential pressure to be developed between the right-hand and left-hand hydraulic assist cylinder chambers. The "boost characteristic" of the rotary valve, that is the functional relationship between the above mentioned input torque and differential pressure, is determined for a given steering gear application by the geometry of axially extending contours formed on the edges of the grooves of the input-shaft adjacent to its outside diameter.

The general method of operation of such conventional rotary valves is well known in the art of power steering design and so will not be described in any greater detail in this specification. An excellent description of this operation is contained in U.S. Pat. No. 3,022,772 (Zeigler), commonly held as being the "original" patent disclosing the rotary valve concept.

During "on-centre" driving such as typical medium or high speed freeway situations, where valve operating angles are a maximum of perhaps 0.3 degrees, the presence of the torsion bar in such valves significantly degrades the stiffness of a power steering gear compared to its manual (non power assisted) counterpart. This is because the torsion bar is, by far, the most compliant element in the mechanical drive train in the steering gear and very little "hydraulic stiffness" is generated by the servo action of the steering gear, due to the low levels of hydraulic assist pressure associated with the on-centre operating region of the power steering valve. The stiffness of a rotary valve actuated rack and pinion power steering gear is studied in detail in documents such as "Analysis of Stiffness and Feel for a Power-Assisted Rack and Pinion Steering Gear" (SAE Technical Paper No. 880706) where it is shown that the on-centre stiffness of such a power steering gear is typically 5–10 times lower than that of the equivalent manual steering gear.

The dominant effect of torsion bar compliance on the overall on-centre stiffness of a steering gear is well recognised in the power steering industry. In a conventional rotary valve it is of course possible to utilise a stiffer torsion bar in the valve however, in order to maintain acceptably low steering effort levels during cornering and parking, the inevitable result is a proportional decrease in the valve operating angle. This increases the accuracy requirement for the power steering valve componentry, in particular the geometric precision of the afore-mentioned axially extending contours formed on the edges of the grooves in the input-shaft and the matching edges of the blind-ended slots in the sleeve. Also balancing or centring of such valves, a manufacturing assembly operation in which the input-shaft and torsion bar are pinned in a highly accurate angular orientation such that the boost characteristic is symmetrical for left-hand and right-hand input torques, is much more difficult to control for stiffer torsion bars. These manufacturing problems, combined with the greater stress levels associated with such stiff torsion bars for a given axial length, limit the stiffness of practical torsion bars in a conventional rotary valve to a maximum of about 2 Nm/degree.

For this reason, over the last 10 years, new power steering valve systems have evolved which enable a torsion bar of practical stiffness to be utilized, however this torsion bar augmented by a centring mechanism which acts to preload the valve to its neutral condition. Such systems, theoretically at least, provide effectively infinite torsion bar stiffness up to a threshold input torque beyond which rotational displacement occurs between input-shaft and sleeve elements as occurs in a conventional rotary valve. This threshold input torque is usually arranged to at least encompass that range of torques associated with on-centre driving and hence the steering system will provide essentially a "manual feel" under these conditions, that is maximum precision and feel.

These new systems can be broadly classified into the two categories of pressure modulated and mechanical centring mechanisms.

Pressure modulated centring mechanisms have been used in some prior art speed sensitive valve systems to progressively increase steering efforts with vehicle speed and are of three main types.

Firstly, mechanisms such as those described in U.S. Pat. Nos. 4,819,545 (Dymond) and 4,593,783 (Honaga et al.) rely upon balls trapped between opposed sets of triangular notches in two relatively axially slideable plungers in the rotary valve and mutually urged together (or relieved) by hydraulic pressure acting on the plungers. Normally one of the notched plungers is rigidly rotationally attached to the input-shaft and the other to either the sleeve or pinion. This mechanism therefore effectively forms a rotational detent between the sleeve and input-shaft and the centring torque between these components, corresponding to the threshold torque of the detent, is constant for the entire operating angle of the valve for a given hydraulic pressure. This constant centring torque algebraically adds to the linearly increasing centring torque of the torsion bar and can be modulated by varying the magnitude of the hydraulic pressure via a control valve. Such arrangements add substantial axial length, typically 20 mm, to the rotary valve. Moreover, since essentially point contact exists at the interface between the balls and the notches, very high Hertzian stresses will be involved, tending to limit the working life of such a device. Extreme precision in locating the notches in the opposed plungers is required if a "dead area" of response is to be avoided in on-centre driving, caused by the centring effect produced by the various notches opposing rather than adding.

Secondly, mechanisms such as those described in UK Patent 2,199,000 (Adams) and U.S. Pat. Nos. 4,593,783 (Honaga et al.), 4,619,339 (Futaba et al.), 4,651,622 (Yoshida), 4,759,420 (Schipper et al.) and 4,796,715 (Futaba et al.) also rely on a detent, however this detent is arranged radially rather than axially. The plungers consist of balls or spherically tipped pistons which slide in accurate radial bores in the sleeve or pinion, and are urged by hydraulic pressure into notches on the outside diameter of the input-shaft. The detent action is similar to the previous case except that, because no rolling takes place, a large amount of friction occurs at the sliding detent interface which produces corresponding hysteresis in the valve boost characteristic. This friction, exacerbated by again the high Hertzian contact stresses characteristic of the essentially point contact between the balls and notches, will tend to generate high levels of wear and hence fast degradation of the contact surfaces. In mechanisms such as described in U.S. Pat. Nos. 4,593,783 (Honaga et al), 4,619,339 (Futaba et al) and 4,651,622 (Yoshida) it is virtually impossible to utilize a cylindrical contact surface on the tips of the pistons because the axi-symmetric geometry of the piston would make it difficult to maintain the orientation of such cylindrical surfaces parallel with the axis of the respective notches. Such cylindrical contact surfaces would result in line (rather than point) contact with corresponding much reduced Hertzian stresses and levels of wear. This radial arrangement of plungers not only increases the axial length of the rotary valve but its diameter in many cases. Also the notches in the outside diameter of the input-shaft and the radial bores in the sleeve or pinion (in which the plungers slide) must all be extremely accurately circumferentially aligned to ensure correct kinematics of the detent action. As referred to earlier, any such misalignment will cause a "dead area" in the on-centre response of the vehicle.

Thirdly, mechanisms such as those described in U.S. Pat. Nos. 4,637,484 (Ijiri et al.), 4,681,184 (Suzuki et al.) and 4,905,784 (Yamashita) employ two parallel sets of opposing trapped pistons which, under hydraulic pressure, exert a centring torque between the input-shaft and the sleeve or pinion to augment the torsion bar. Protrusions on the ends of the pistons contact opposing sides of radial extensions on the input-shaft and the centring force is therefore proportional to the modulation pressure. This class of mechanism is relatively friction free however the incorporation of the four pistons results in significant additional axial length in the valve and also the necessity for the valve to be much larger in overall diameter. This exacerbates the problem of synchronizing the action of the four pistons and, without such synchronization, will lead to the earlier referred to "dead area" of response during on-centre driving.

All three classes of pressure modulated centring systems share the common disadvantage of the complexity of the hydraulic actuation, generally requiring additional porting and seals within the rotary valve and solenoid or stepper motor driven modulation valves interposed in the hydraulic connections to the rotary valve. Some systems even employ a separate hydraulic pump to supply oil pressure to the plungers. Supply of hydraulic modulation pressure to the valve at high speed, via additional seals etc., inevitably results in these systems exhibiting more on-centre friction than a conventional rotary valve. Also, although the complexity and hence high manufacturing cost of these systems is perhaps justified in some speed sensitive valve applications where it is necessary to vary the centring torque as a function of vehicle speed, many speed sensitive and indeed all non speed sensitive applications are ideally served by a centring mechanism which provides the previously described constant threshold input torque consistent with optimum on-centring driving precision and feel.

Prior art mechanical centring mechanisms are all aimed at providing such a constant threshold input torque, typically 0.5–1.0 Nm to null any torsion bar deflection during on-centre driving, and require no additional hydraulic sub-systems for their actuation. They fall into two major categories.

Firstly, mechanisms such as those described in UK Patent 2,165,502 (Adams) and U.S. Pat. No. 4,428,399 (Masuda) rely upon a large "C-spring" which circumferentially envelopes the rotary valve and is intended to either augment the torsion bar or, alternatively, actually replace the torsion bar. Radial pins extending from the pinion (or sleeve) and the input-shaft are doubly-trapped and preloaded in an axially aligned position between the two adjacent arms of the C-spring, and a threshold input torque must therefore be applied to the input-shaft before any valve operating angle is generated. C-spring arrangements have the disadvantage that their deflection must encompass not only the entire normal valve operation angle (typically $+/-4$ degrees) but must be designed not to be overstressed at the so called "fail safe" angle (typically $+/-7$ degrees). This large fail safe angle is determined by a lost-motion drive arrangement in conventional rotary valves which mechanically limits valve operating angle in the event of torsion bar breakage or loss of hydraulic supply from the pump. In order that the C-spring provide the earlier stated threshold input torque of 0.5–1.0 Nm, it must be axially long (measured parallel to the axis of the rotary valve) in order to avoid overstressing at the fail safe angle of about 7 degrees, and therefore results in additional axial length of the rotary valve. Also, if the C-spring arrangement is used to augment, rather than replace the torsion bar, manufacturing problems exist relating to the aforementioned balancing operation and ensuring that the valve operating centre defined by the torsion bar is accurately aligned with the operating centre defined by the C-spring. These design and manufacturing problems have meant that this technology has not been widely adopted in the industry.

Secondly, the mechanism described in U.S. Pat. No. 4,774,847 (Breitweg) relies on balls trapped between opposed sets of triangular notches in two relatively axially slideable plungers and, in this sense, this arrangement is similar to the pressure modulated mechanism already described in reference to U.S. Pat. No. 4,593,783 (Honaga et al.). However the entire arrangement is axially miniaturized and envelopes the torsion bar, hence forming a torsion bar assembly which can be balanced using normal manufacturing operations. The moveable plunger is urged towards the fixed plunger by a bellows spring which also serves to rotationally fix the moveable plunger to the appropriate end of the torsion bar assembly. Because the entire assembly is packaged inside the input-shaft, as per a torsion bar in a conventional rotary valve, the input-shaft must be essentially tubular in order to accommodate the assembly's diameter (typically about 16 mm). To date this arrangement has been employed in valves with a 22 mm input-shaft outside diameter. It would be difficult to miniaturise the assembly further so that it could be employed in the majority of power steering valves which employ input-shafts with less than 21 mm outside diameter. Again the use of miniature balls to achieve the detent action results in high Hertzian contact stresses. In addition the torsion bar assembly must be separately adjusted to ensure that the "doubly-trapped" condition, corresponding to 4 point contact on each ball, also corresponds to the operating centre (i.e. the nondeflected state) of the internal torsion bar. These facts, combined with the complexity of the detented torsion bar assembly, means that the marginal cost of the system is high and it cannot be practically offered as an "add-on" feature to a conventional diameter rotary valve. In another mechanical centring mechanism shown in German Patent No. 3,634,215 (Breitweg) a similar principle of balls trapped between opposed sets of triangular notches is also used. However, in this latter patent, a single set of notches are used, one notch machined on the axial end face of the sleeve and the opposing notch formed on a spring steel collar which is clamped onto the outside diameter of the input-shaft. This assembly, however, would be expected to be relatively torsionally compliant and therefore add little on-centre stiffness to that of the torsion bar.

In light of the shortcomings of the prior art the present applicant has, in a co-pending application, described an invention the aim of which is to provide a centring mechanism capable of incorporation into a conventional speed sensitive or non speed sensitive rotary valve of standard outside diameter, typically about 37.5 mm. The device should also introduce minimum additional length to the rotary valve and be useable as an "add on" or optional feature to improve the on-centre performance of an otherwise standard format rotary valve. As explained earlier, the centring mechanism is aimed at preloading the valve to its neutral condition up to a threshold input torque of 0.5-1.0 Nm (approximately) consistent with on-centre driving. Precision and feel under these circumstances will only be optimized if valve friction is also absolutely minimized. An entirely mechanical centring mechanism employing only rolling contact is consistent with this aim and is therefore one element of this invention. A further limitation of most prior art hydraulically or mechanically actuated centring mechanisms employing two or more detent elements (e.g. rollers, balls, or spherically tipped pistons) is that the arrays of notches must be extremely accurately circumferentially disposed to ensure synchronous detent action at all detent elements involved. Without this synchronous action the aforementioned "dead area" will exist in the detent action, eliminating most of the on-centre stiffness benefits normally resulting from such a centring mechanism. The object of the present invention is to provide a mechanical centring mechanism which incorporates all the necessary degrees of adjustability, prior to final fixing to the power steering valve, to ensure synchronous detent action of the two or more detent elements involved and also to ensure that the precise valve centre so generated exactly angularly corresponds to the neutral (nondeflected) condition of the torsion bar.

The present invention consists in a rotary valve for a power steering gear comprising an input-shaft, a sleeve, a driven member and an entirely mechanically actuated centring mechanism, all these components sharing a common central axis, the centring mechanism comprising a carrier and two or more rolling elements, each rolling element being disposed between a pair of opposed notched elements, a first notched element of each pair being fixed with respect to or integral with the input-shaft and a second notched element of each pair being supported in the carrier and being moveable towards or away from the first notched element but rotationally fixed with respect to the carrier about the central axis of the centring mechanism, the carrier being secured to the sleeve or driven member by securing means, each second notched element being urged towards the first notched element of the pair by spring means to trap one of the rolling elements between them, thereby producing detent action between the input-shaft and the sleeve or driven member whereby relative rotation occurs between the input shaft and the sleeve or driven member only upon application of an input torque exceeding a predetermined threshold, characterised in that the securing of the carrier to the sleeve or driven member is carried out after assembly of the centring mechanism to the sleeve or driven member, the carrier and the securing means being constructed and arranged so that, after said assembly but prior to said securing, the carrier is free to float to a small degree both radially and rotationally relative to the sleeve or driven member in a plane extending perpendicular to the central axis of the rotary valve and thereby, under the urging of the spring means, assume a force equilibrium position in which doubly-trapped four-line or four-point contact takes place simultaneously at the interface of each rolling element and its respective pair of opposed notched elements and, thereby after said securing, causing the detent action produced by each rolling element and its respective pair of opposed notched elements to occur in synchronism.

The present invention in another aspect consists in a rotary valve for a power steering gear comprising an input-shaft, a sleeve, a driven member and an entirely mechanically actuated centring mechanism, all these components sharing a common central axis, the centring mechanism comprising a carrier and two or more rolling elements, each rolling element being disposed between a pair of opposed notched elements, a first notched element of each pair being fixed with respect to or integral with the input-shaft and a second notched element of each pair being supported in the carrier and being moveable towards or away from the first notched element but rotationally fixed with respect to the carrier about the central axis of the centring mechanism, the carrier being secured to the sleeve or driven member, each second notched element being urged towards the first notched element of the pair by spring means to trap one of the rolling elements between them, thereby producing a detent action between the input-shaft and the sleeve or driven member, whereby relative rotation occurs between the input-shaft and the sleeve or driven member only upon application of an input torque exceeding a predetermined threshold, characterised in that the carrier has mounting holes facilitating its securing to the sleeve or driven member by screws, bolts, rivets or other axial fixing means, the mounting holes providing clearance with respect to the diameter of the axial fixing means, this clearance permitting a small degree of radial and rotational float of the carrier with respect to the sleeve or driven member, in a plane perpendicular to the central axis of the valve, prior to the carrier being secured to the sleeve or driven member thereby allowing the carrier to take up a force equilibrium position under the urging of said spring means such that after the carrier is secured the detent action produced by the two or more rolling elements and their respective pair of opposed notched elements occurs in synchronism.

It is preferred that each rolling element is cylindrical in shape and makes essentially line contact with prismoidally shaped notches in the notched elements. This reduces the Hertzian stresses between the contour of the notches and a given diameter rolling element, and hence considerably reduces the diameter of the rolling element compared to an equivalently stressed spherical element.

It is also preferred that the centring mechanism is arranged with the detent acting essentially radially with respect to the central axis of the rotary valve and the axes of the cylindrical rolling elements, and the corresponding prismatic notches of the notched elements, arranged parallel with this axis. The carrier can be positioned at either end face of the sleeve and the centring mechanism arranged to act directly between the input-shaft and sleeve to augment the torsion bar. Alternatively the carrier can be secured to the end face of the driven member closest to the input-shaft, this driven member taking the form of a pinion in the case of a rack and pinion steering gear or a worm in the case of a recirculating-ball-nut or worm-and-sector steering gear. Again the centring mechanism will be arranged to act directly on the input-shaft. In both cases, if the rolling elements take the preferred form of cylindrical rollers, the input-shaft will incorporate two or more axially aligned notches on its outside diameter which constitute the inner notched elements. Generally, for reasons of packaging, the centring mechanism will consist of two diametrically opposed rollers and hence two axially aligned diametrically opposed notches on the outside diameter of the input-shaft. However for certain applications, perhaps physically larger rotary valves, three or even more rollers could be arranged around the outside diameter of the input-shaft.

However, for any such multi-rolling element centring mechanism design, the use of a floating carrier according to the present invention will ensure that the individual detent elements are synchronised, that is 4-line contact (for cylindrical rolling elements) or 4-point contact (for balls) will occur at all detent elements simultaneously. Also use of this floating carrier ensures that the precise centre created by this "doubly-trapped" condition corresponds angularly to the operating centre of the valve torsion bar, that is the point of zero deflection, and also ensures that the carrier is in force equilibrium with respect to the sleeve or driven member in this condition.

In a first preferred embodiment, a flat faced carrier is secured to the end face of the sleeve by screws, and this carrier includes two diametrically opposed, radially extending rectangular grooves. Each such groove houses a rectangular notched plunger which radially slides in the groove with virtually zero side clearance. A rolling element is trapped between the notch in each plunger and the adjacent notch on the outside diameter of the input-shaft. The notched plungers are loaded radially inwardly by two C springs which contact the radially outermost face of the plungers. The notched plungers, rolling elements and C springs are axially restrained via a cover plate which also acts as a non rotating washer and locking tab for the attachment screws. The mounting holes in the carrier are large compared to the major diameter of the attachment screws, or other fixing means, and therefore a small degree of "float" is possible of this carrier with respect to the end face of the sleeve, both radially and also rotationally prior to securing. This ensures that the centring mechanism is precisely rotationally matched to the centring forces supplied by the torsion bar after securing. That is, for zero torsion bar centring torque, the opposed cylindrical rollers are engaged in 4-line contact with the detent notches i.e. 2-line contact with the prismatic notch on the outside diameter of the input-shaft and, simultaneously, 2-line contact with the prismatic notch on the inwardly facing surface of the notched plungers.

In a third preferred embodiment of the present invention, the carrier comprises a sheet metal pressing which is again attached to the end face of the sleeve by screws, or other securing means. The carrier is provided with lugs which are shaped to form a cage for the cylindrical rollers, so providing both lateral and axial restraint for their movement. Leaf springs bear on opposed hinged detent levers which each incorporate a prismatic notch on their inwardly facing surface. The ends of the leaf springs are supported by ledges, also formed as part of the carrier. Because of the hinging action of the detent levers, very little friction is associated with the detent action. Again the mounting holes in the carrier are large compared to the major diameter of the screws, or other securing means, and therefore a small degree of "float" is possible of this carrier with respect to the end face of the sleeve, both radially and also rotationally, prior to securing.

Figure 2:
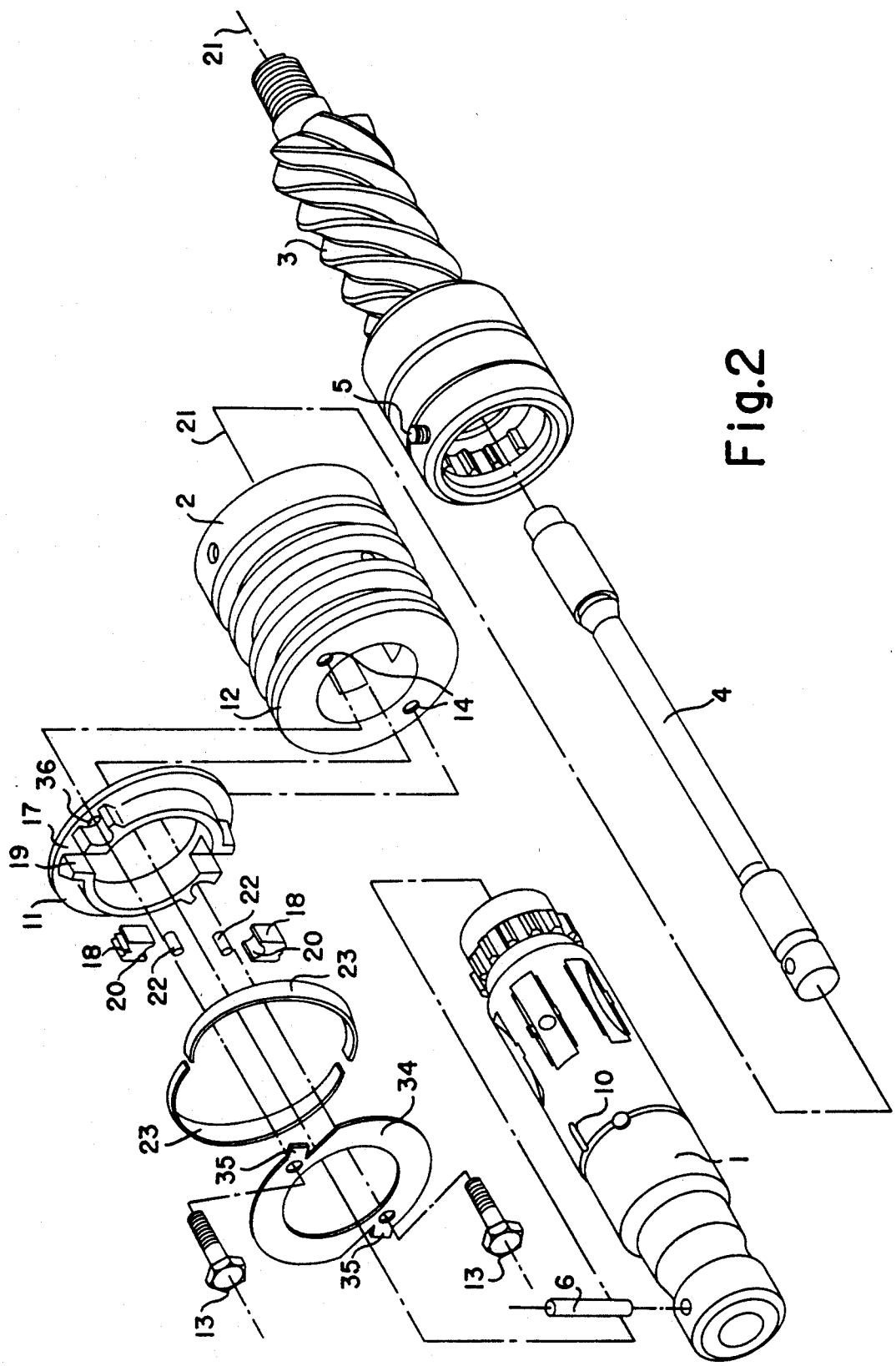
Figure 3:
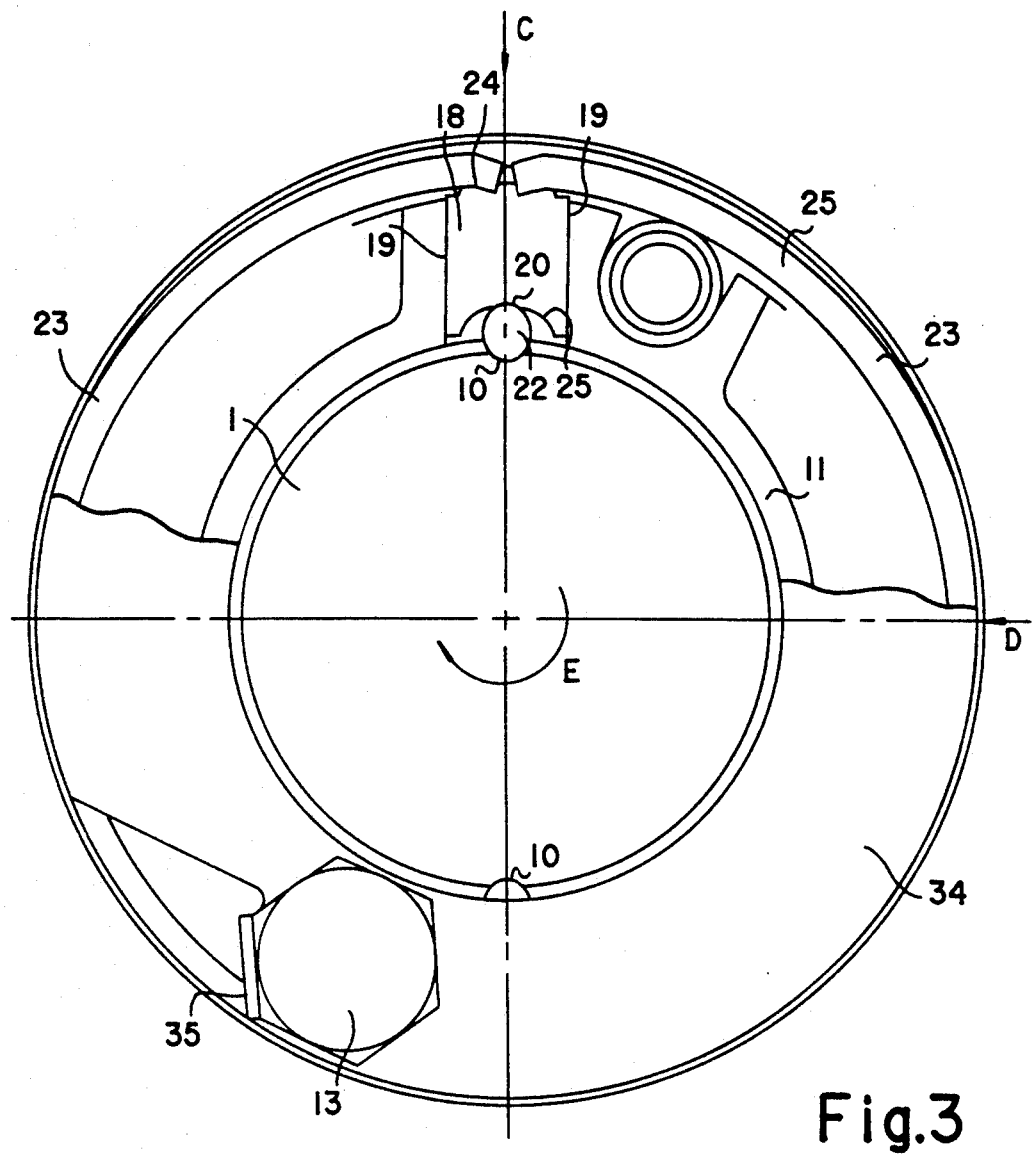
Figure 3A:
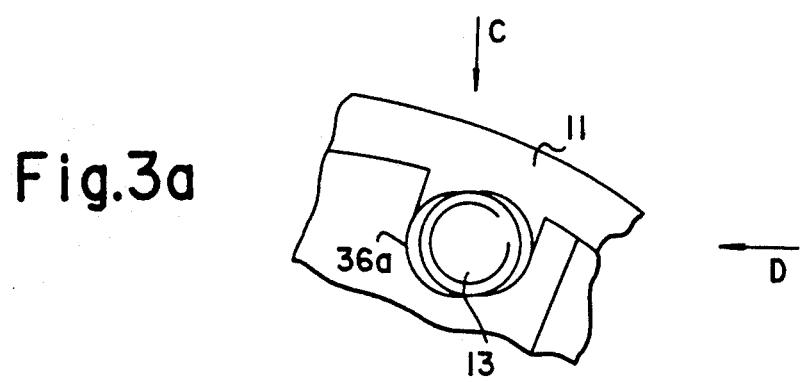
Figure 4:
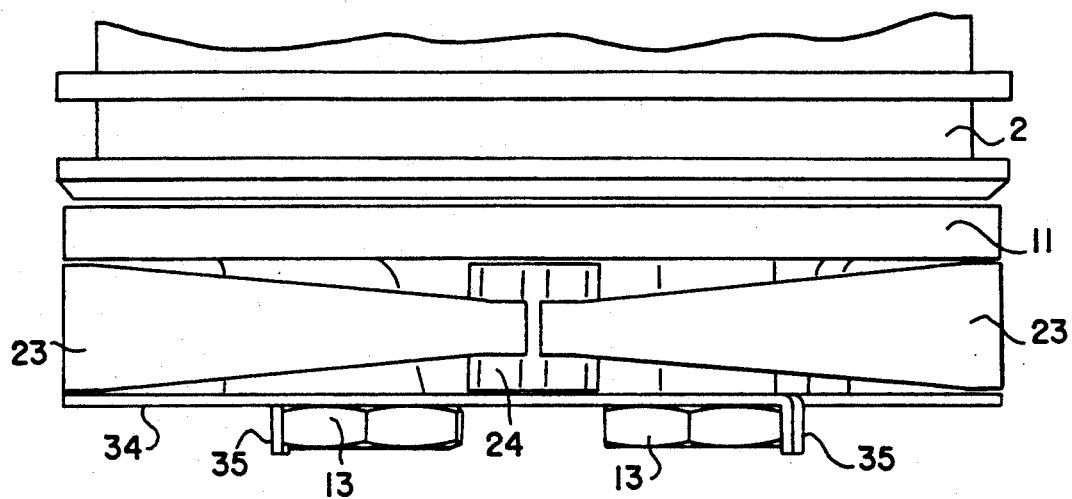
Figure 5:
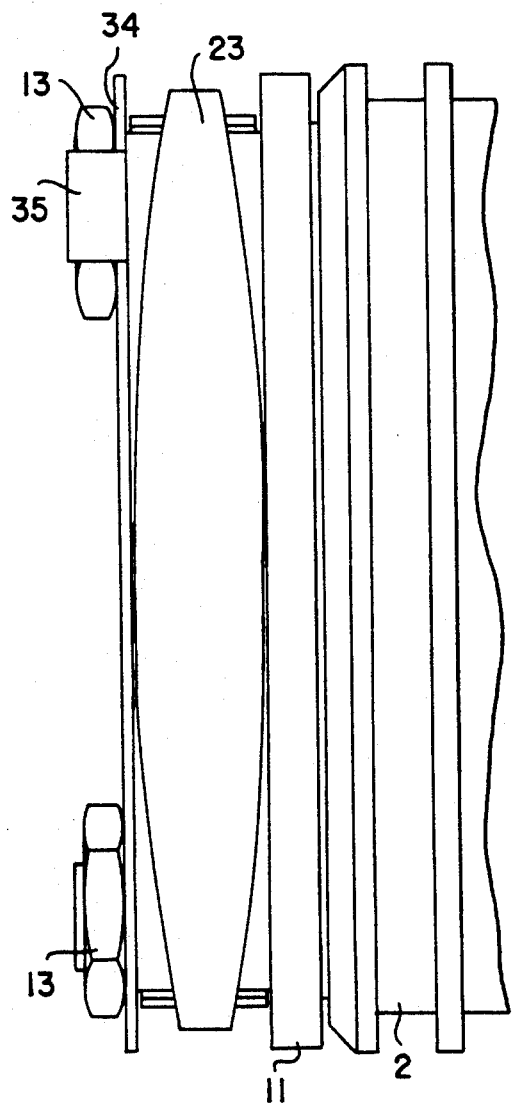

The present invention will now be described by way of example with reference to the accompanying drawings in which:

FIG. 1 is a sectional elevation through a rotary power steering valve incorporating a first embodiment of the invention, FIG. 2 is an exploded isometric view of the rotary power steering valve shown in FIG. 1, showing the details of the assembly of the componentry in the centring mechanism, FIG. 3 is a part sectional end elevation, on plane AA in FIG. 1 of the centring mechanism according to the first embodiment of the invention, FIG. 3a shows an alternative form of the first embodiment where one of the locating holes 36 in carrier 11 is narrowed, hence forming slot 36a, FIG. 4 is a plan view in direction C in FIG. 3, FIG. 5 is an elevation in direction D in FIG. 3,.

Figure 6B:
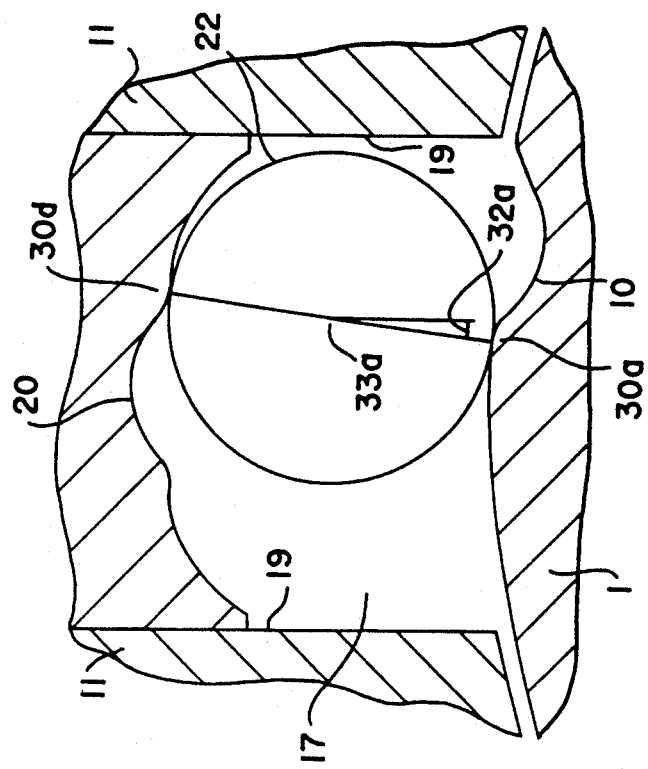
Figure 6A:
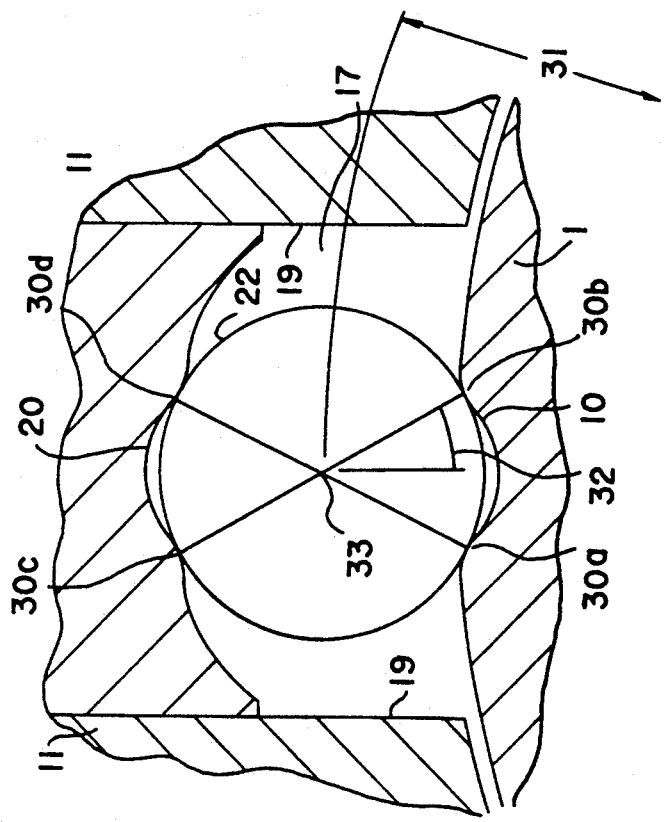
Figure 7:
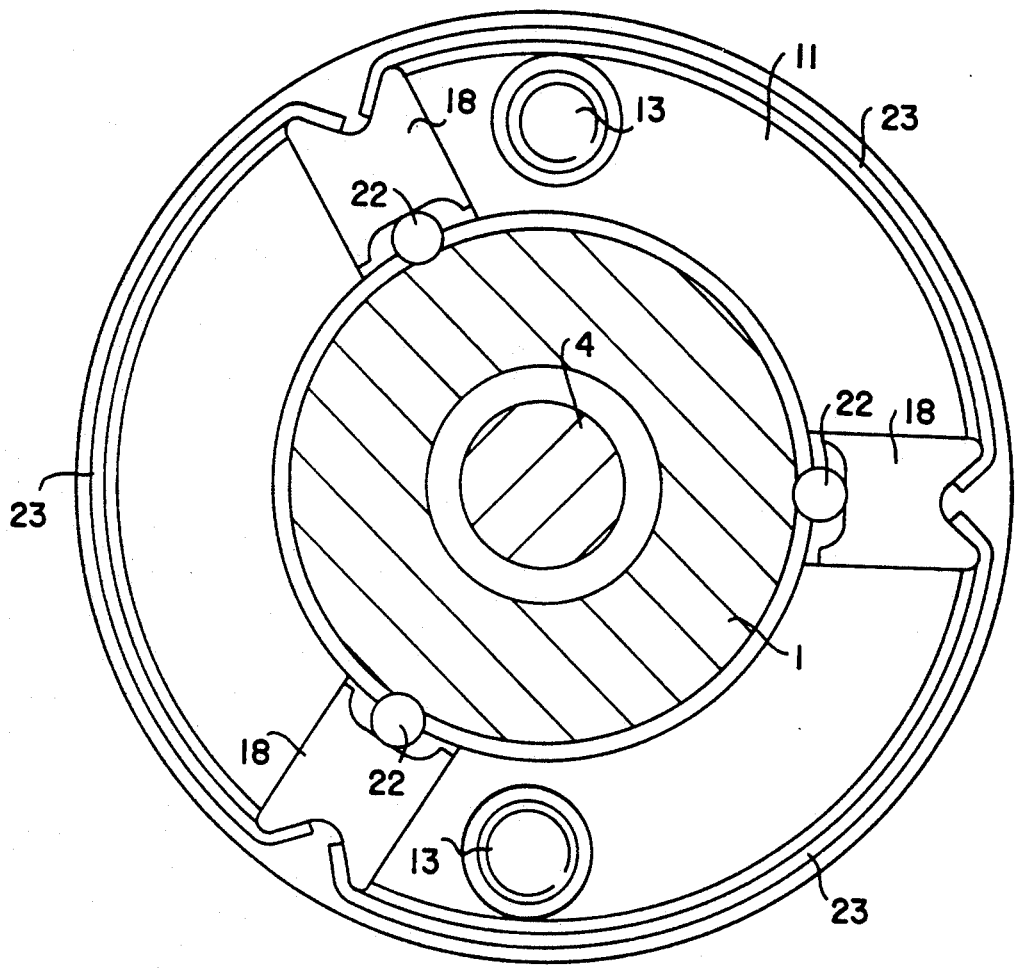
Figure 8:
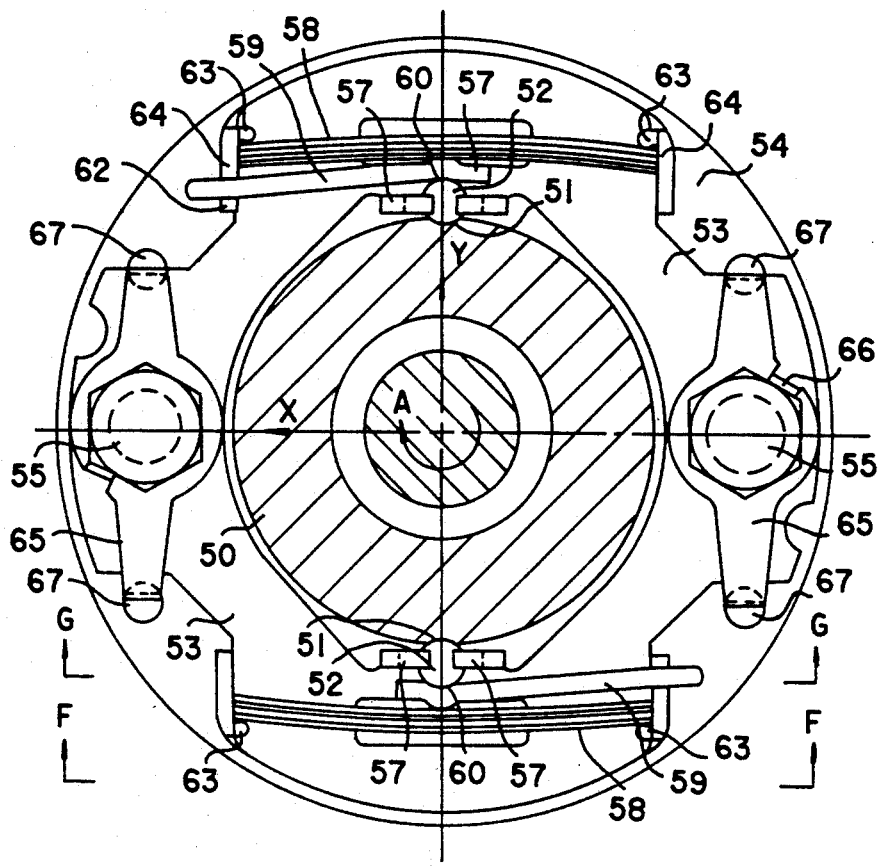
Figure 9:
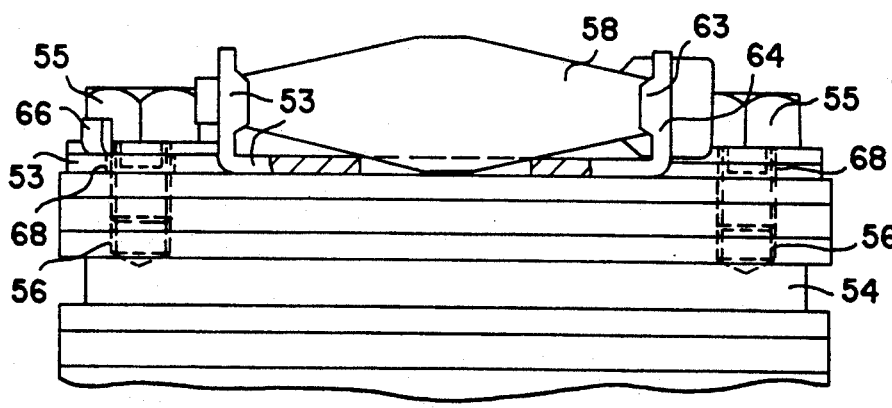
Figures 10, 11:
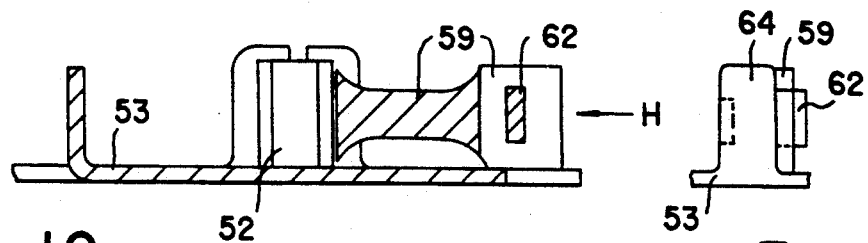

FIG. 6a is a sectional end elevation of the notched and rolling elements of the detent arrangement within the centring mechanism when the valve is in the neutral condition, FIG. 6b is a sectional end elevation of the notched and rolling elements of the detent arrangement within the centring mechanism when the valve has been angularly displaced from the neutral condition, FIG. 7 is a second embodiment of the invention employing three notched plungers and three interconnecting C springs, FIG. 8 is a sectional end elevation of a third embodiment of the invention, FIG. 9 is a sectional elevation on plane FF in FIG. 8 of the centring mechanism, FIG. 10 is a sectional elevation on plane GG in FIG. 8 of the centring mechanism, and FIG. 11 is an end elevation in direction H in FIG. 10.

FIG. 1 shows the valve assembly incorporating input-shaft 1 journalled inside sleeve 2 and resiliently connected to pinion 3 (the driven member) by torsion bar 4. Sleeve 2 is rotationally connected to pinion 3 by sleeve drive pin 5, while torsion bar 4 is fixed at its left end to input-shaft 1 by torsion bar pin 6 and fixed at its right end to pinion 3 by swaged connection 7. Therefore an input torque applied at input-shaft 1 angularly deflects torsion bar 4 and causes relative angular displacement between input-shaft 1 and sleeve 2, known as the valve operating angle. The manner in which this valve operating angle serves to produce the hydraulic assistance in the steering gear, and thus impart an axial output force to rack 8, is well understood by persons knowledgeable in the art of power assisted steering gears and will not be detailed further in this description.

The valve assembly also incorporates centring mechanism 9 mounted on the end of sleeve 2 remote from pinion 3. This mechanism is shown in more detail in FIGS. 2, 3, 4 and 5. Centring mechanism 9 is arranged to act directly between input-shaft 1 and sleeve 2 to produce a centring torque between these elements which augments the linear centring torque derived from torsion bar 4. Input-shaft 1 incorporates two diametrically opposed, axially aligned, prismatic notches 10 on its outside diameter. Carrier 11 of centring mechanism 9 is flat faced and attached to end face 12 of sleeve 2 by two hexagonal headed screws 13 engaged in drilled and tapped holes 14 in the end face of sleeve 2. Carrier 11 includes two diametrically opposed, radially extending grooves 17, each groove 17 incorporating a rectangular notched plunger 18 which radially slides along the parallel side faces 19 of groove 17 with virtually zero clearance. Prismatic notches 20 in the radially innermost faces of plungers 18 are also axially aligned with the central valve axis 21. Cylindrical rollers 22 are trapped between notch 20 in each plunger 18 and the adjacent notch 10 on the outside diameter of input-shaft 1. The radially innermost portion of notched plungers 18 also includes radiused dead stops 25 which serve to correct misorientation and limit the travel of cylindrical rollers 22. Notched plungers 18 are loaded radially inwardly by two C springs 23 supported on contoured portion 24 of notched plungers 18.

The urging together of plungers 18 loads each cylindrical roller 22 between its respective notch 20 in plunger 18 and its adjacent notch 10 on the outside diameter of input-shaft 1 as a "doubly-trapped" rolling action detent. For input torques not exceeding the threshold input torque of the detent, four-line contact occurs on each cylindrical roller 22 as at contact points 30 a-d in FIG. 6a. At each contact point 30 a-d, the contour of the respective notch 10 or 20 is tangential to the cylindrical surface of cylindrical roller 22 and, with knowledge of the actual geometry of the detent and remaining componentry of centring mechanism 9, enables simple calculation of the threshold input torque. For the embodiment shown incorporating two cylindrical rollers 22 and two C springs 23, each preloaded to a force F in the neutral condition, the threshold input torque T is given by the equation:

$$T = 2F \times \text{radius } 31 \times \tan(\text{angle } 32)$$

where radius 31 is the radial distance between valve axis 21 and the centre 33 of cylindrical roller 22, and angle 32 is half the subtended angle of contact points 30a and 30b with respect to centre 33.

When input torques exceeding this threshold are applied to input-shaft 1, plungers 18 are progressively radially driven out against the reaction force applied by C springs 23 and the cylindrical rollers 22 roll in two-line contact between adjacent notches in input-shaft 1 and plungers 18 as valve rotation corresponding to the valve operating angle occurs. These two lines of contact are again shown as contact points 30a and 30d in FIG. 6b. It is also seen that the centring torque resulting from the detent in its now displaced position has considerably reduced, mainly due to the reduction of angle 32 to angle 32a.

Axial restraint of cylindrical rollers 22, notched plungers 18 and C springs 23 is via cover plate 34. Cover plate 34 also acts as a non rotating washer for hexagonal headed screws 13 and also facilitates locking of these screws via tabs 35. C springs 23, although shown as being of uniform thickness, are of varying width measured in the axial direction. According to usual practice in the design of C springs, greatest width is used in their central region where maximum bending moment is to be sustained whereas their extremities, adjacent to their point of contact with contoured portion 24 of notched plungers 18, is subject to lesser bending moment and can therefore afford to be narrower. In this manner bending stresses are more uniformly distributed in the C spring compared to if the C spring was of uniform width and, for a given maximum stress level, provides minimum spring rate.

A particular feature of this embodiment is the means by which the centring mechanism may be made to be aligned perfectly during the attachment of carrier 11 to sleeve 2. It is, of course, ideally necessary that the centring mechanism is precisely rotationally matched to the centring torque supplied by torsion bar 4, and that, when this torsion bar centring torque is zero, the opposed cylindrical rollers 22 are engaged in 4-line contact with the detent notches, (i.e. 2-line contact with each prismatic notch 10 and 20). For this to be possible consistent with normal engineering tolerances on such components, carrier 11 must be capable of fine adjustment both rotationally (i.e. in direction E) and laterally (i.e. in direction C) prior to final securing.

The two large locating holes 36 in carrier 11 are a clearance fit compared to the major diameter of the threads of screws 13. Hence, if screws 13 are relaxed as during assembly, the entire mechanism will rotate in direction E and laterally slide in direction C and thereby assume this ideal position. Thereafter screws 13 are tightened to rigidly secure carrier 11 to sleeve 2. Tabs 35 of cover plate 34 are then deformed around the hexagonal heads of screws 13 for permanently locking these screws during the service life of the steering gear. In the case of this first embodiment, the position of the mechanism in direction D is relatively unimportant during assembly and would, for example, be determined by external fixturing. Alternatively one of the locating holes 36 in carrier 11 could be narrowed in direction D thus forming slot 36a as shown in FIG. 3a and hence eliminating possible motion of carrier in this direction.

The symmetrically disposed C spring arrangement ensures minimum side loading between side faces 19 of grooves 17 and the sliding surfaces of notched plungers 18, thereby minimising friction and wear. It is, of course, possible that for certain applications the resilient member could consist of only a single C spring. The C spring could be manufactured from a single sheet of spring steel or, alternatively, multilayered or leaved.

For applications requiring a large amount of detent action, it is also possible that three notched plungers could be employed in the mechanical detent mechanism, mutually radially disposed at approximately 120 degrees around the input-shaft. In this second embodiment three C springs would then be used to mutually interconnect these plungers thereby avoiding any of the aforementioned side loading (refer to FIG. 7). Still alternatively, four notched plungers could be radially disposed at approximately 90 degrees around the input-shaft with an appropriate set of four C springs. In general though, the larger the number of plungers and C springs, the less the space or "footprint" available for the mounting screws. For applications to date, two plungers (and two C springs) have been found optimum.

A third embodiment of the present invention will now be described in reference to FIG. 8, 9, 10 and 11.

In this third embodiment, input-shaft 50, prismatic notches 51, and cylindrical rollers 52 are substantially the same as for the earlier described first embodiment, and correspond to items 1, 10 and 22 respectively in FIGS. 1-6. Carrier 53 now comprises a sheet metal pressing which is attached to sleeve 54 by two hexagonal headed screws 55 engaged in drilled and tapped holes 56 in the end face of sleeve 54. Carrier 53 is provided with lugs 57 which are bent up as shown to form a cage for cylindrical rollers 52, and so provide both lateral and axial restraint for their movement as in the case of radiused dead stops 25 of the earlier described first embodiment. Leaf springs 58, typically four on each side of input-shaft 50, bear on opposed detent levers 59 which each incorporate prismatic notch 60 on its inward facing surface. These surfaces are locally hardened in order to sustain the high Hertzian stresses resulting from contact with cylindrical rollers 52. Springs 58 are supported within carrier 53 by ledges 63 formed on ears 64 formed integral with carrier 53.

In FIG. 8 input-shaft 50 is shown in its neutral condition with respect to sleeve 54. The entire action of the centring mechanism, as relative rotation occurs between these elements, is exactly the same as previously described except that plungers 18 are now replaced by detent levers 59. Note that the lateral force between cylindrical rollers 52 and detent levers 59, upon relative rotation, are transferred to carrier 53 via the "tongue-and-slot" engagement between rectangular slots 61 in detent levers 59 and tongues 62 formed as part of ears 64. The slight rotation of detent levers 59 which occurs when springs 58 are deflected is accommodated by the hinging action provided by this tongue and slot engagement. Note that this hinging action is essentially free of friction as compared to that which may occur in the earlier described first embodiment, wherein the lateral forces applied to plungers 18 are transferred to carrier 11 by sliding engagement with wide faces 19 of grooves 17.

Again, according the present invention, the centring mechanism may be made to be aligned perfectly during the attachment of carrier 53 to sleeve 54. It is necessary that the centring mechanism is precisely rotationally matched to the centring torque supplied by torsion bar 4, and that, when this torsion bar centring torque is zero, the opposed cylindrical rollers 52 are engaged in 4-line contact with the detent notches (that is 2-line contact with each prismatic notch 51 and 60). For this to be possible consistent with normal engineering tolerances on such components, carrier 53 must be capable of fine adjustment both rotationally (i.e. in direction A) and radially (i.e. in direction X or Y or a combination thereof) prior to final securing.

The two large locating holes 68 in carrier 53 are a clearance fit compared to the major diameter of the threads of screws 55. Hence, if screws 55 are relaxed as during assembly, the entire mechanism will assume this ideal condition. Thereafter, it is only necessary that screws 55 are tightened to rigidly secure carrier 53 to sleeve 54. In order to prevent the tightening of screws 55 disturbing this condition, tab washers 65 are provided having bent ends engaging in shallow holes 67 in sleeve 54. Screws 55 are locked with locking tabs 66 of tab washers 65 to prevent their undoing during the service life of the steering gear.

Note that with all prior art designs of centring devices the matching of the centring device with the torsion bar must be accomplished by a precise centring technique, and the centring action of the opposing (or even four) separate detents must be made to coincide through extreme precision of manufacture. Such extreme precision of manufacture is no longer required according to the present invention.

It will be apparent to people skilled in the art of power assisted steering gears that numerous possible configurations of the present invention are feasible and most of the benefits outlined will result.

We claim:

1. A rotary valve for a power steering gear comprising an input-shaft, a sleeve, a driven member, and an entirely mechanically actuating centring mechanism, all these components sharing a common central axis, the centring mechanism comprising a carrier and at least two rolling elements, each rolling element being disposed between a pair of opposed notched elements, a first notched element of each pair being fixed with respect to or integral with the input-shaft and a second notched element of each pair being supported in the carrier and being moveable towards or away from the first notched element but rotationally fixed with respect to the carrier about the central axis of the centering mechanism, the carrier being secured to at least one of the sleeve and driven member by securing means, each second notched element being urged towards the first notched element of the pair by spring means to trap one of the rolling elements between them, thereby producing detent action between the input-shaft and at least one of the sleeve and driven member whereby relative rotation occurs between the input-shaft and at least one of the sleeve and driven member only upon application of an input torque exceeding a predetermined threshold, wherein the carrier and the securing means are configured so that, prior to the carrier being secured, the carrier is free to float to a small degree both radially and rotationally relative to at least one of the sleeve and the driven member in a plane extending perpendicular to the central axis of the rotary valve and wherein, under the urging of the spring means, said carrier is disposed in a force equilibrium position in which doubly-trapped four-line or four-point contact takes place simultaneously at the interface of each rolling element and its respective pair of opposed notched elements and, thereby after said carrier is secured, causing the detent action produced by each rolling element and its respective pair of opposed notched elements to occur in synchronism.

2. A rotary valve for a power steering gear comprising an input-shaft, a sleeve, a driven member and an entirely mechanically actuated centring mechanism, all these components sharing a common central axis, the centring mechanism comprising a carrier and two or more rolling elements, each rolling element being disposed between a pair of opposed notched elements, a first notched element of each pair being fixed with respect to or integral with the input-shaft and a second notched element of each pair being supported in the carrier and being moveable towards or away from the first notched element but rotationally fixed with respect to the carrier about the central axis of the centring mechanism, the carrier being secured to the sleeve or driven member, each second notched element being urged towards the first notched element of the pair by spring means to trap one of the rolling elements between them, thereby producing a detent action between the input-shaft and the sleeve or driven member, whereby relative rotation occurs between the input-shaft and the sleeve or driven member only upon application of an input torque exceeding a predetermined threshold, characterised in that the carrier has mounting holes facilitating its securing to the sleeve or driven member by axial fixing means, the mounting holes providing clearance with respect to the diameter of the axial fixing means, this clearance permitting a small degree of radial and rotational float of the carrier with respect to the sleeve or driven member, in a plane perpendicular to the central axis of the valve, prior to the carrier being secured to the sleeve or driven member thereby allowing the carrier to take up a force equilibrium position under the urging of said spring means such that after the carrier is secured the detent action produced by the two or more rolling elements and their respective pair of opposed notched elements occurs in synchronism.

3. A rotary valve as claimed in claim 1 wherein the rolling elements are cylindrical and make line contact with prismatically shaped contours in the notched elements.

4. A rotary valve as claimed in claim 3 wherein the axes of the rolling elements are disposed parallel to the central axis of the rotary valve.

5. A rotary valve as claimed in claim 1 wherein the spring means are C springs.

6. A rotary valve as claimed in claim 1 wherein the spring means are leaf springs.

7. A rotary valve as claimed in claim 1 wherein the rotary valve also comprises a torsion bar and the synchronism in the detent action produced after said securing also causes the torsion bar to remain in the undetected condition for input torques not exceeding the predetermine threshold.

8. A rotary valve as recited in claim 1, wherein each of said second notched elements are disposed in grooves which are rotationally fixed with respect to the carrier, and wherein said second notched elements are slidably disposed in said grooves to move towards and away from the first notched elements.

9. A rotary valve as recited in claim 1, wherein said second notched elements are movable with respect to said pair of spring means.

10. A rotary valve as recited in claim 1, wherein said centring mechanism comprise no more than two rolling elements.

11. A rotary valve as recited in claim 1, wherein said centring mechanism comprises three rolling elements.

* * * * *